United States Patent [19]

Itoh et al.

[11] Patent Number: 4,945,336
[45] Date of Patent: Jul. 31, 1990

[54] TROUBLE DETECTION APPARATUS FOR AUTOMOBILE AIR-BAG SYSTEM

[75] Inventors: Hisatsugu Itoh; Munehiro Kawabata, both of Sanda, Japan

[73] Assignee: Mitsubishi Denki Kabushiki Kaisha, Tokyo, Japan

[21] Appl. No.: 344,374

[22] Filed: Apr. 28, 1989

[30] Foreign Application Priority Data

May 12, 1988 [JP] Japan ................................. 63-117701

[51] Int. Cl.⁵ .............................................. B60Q 1/00
[52] U.S. Cl. .................................... 340/438; 280/735
[58] Field of Search ............................ 340/438, 425.5; 280/734, 735; 307/10.1

[56] References Cited

U.S. PATENT DOCUMENTS

| | | | |
|---|---|---|---|
| 3,622,974 | 11/1971 | Best et al. ............................ | 340/438 |
| 3,803,569 | 4/1974 | Iwasaki et al. ...................... | 340/214 |
| 4,287,431 | 9/1981 | Yasui et al. ......................... | 307/10 |
| 4,673,912 | 6/1987 | Kumasaka et al. ................. | 340/438 |
| 4,835,513 | 5/1989 | McCurdy et al. .................. | 340/438 |

FOREIGN PATENT DOCUMENTS 61-57219  12/1986  Japan .

Primary Examiner—Joseph A. Orsino
Assistant Examiner—Frank M. Scutch, III
Attorney, Agent, or Firm—Burns, Doane, Swecker & Mathis

[57] ABSTRACT

Acceleration speed sensor (3) and trigger means (4) for separating air-bag includes a Wheatstone bridge with reference resistors, (7A, 8A), whereby when trouble occurs, the balance of Wheatstone bridge is lost and current flows to current transformer (12), wherein D.C. noise component is isolated by the current transformer (12) and A.C. noise component is attenuated by phase detection by using reference pulse signals ($V_0$).

1 Claim, 3 Drawing Sheets

TROUBLE DETECTION APPARATUS FOR AUTOMOBILE AIR-BAG SYSTEM

BACKGROUND OF THE INVENTION

1. Field of the Invention

The present invention relates to a trouble detection apparatus for an automobile air-bag system, and especially relates to a trouble detection apparatus for detecting an acceleration speed sensor and a trigger means for spreading out the air-bag.

2. Description of Prior Art

A conventional trouble detection apparatus for automobile air-bag system, for example shown in Japanese Published Examined Patent Application Sho 61-57219, is described referring to FIG. 3. FIG. 3 is a circuit diagram showing the conventional trouble detection apparatus of the air-bag. In FIG. 3, the air-bag system includes: an ignition switch 2 connected to a battery 1 of an automobile; an acceleration speed sensor 3 for detecting clashing of the automobile thereby closing switch 31; a resistor 32 connected across both contacts of the switch 31; a trigger means 4 for spreading out the air-bag by heating when an electric current is supplied thereto; another acceleration speed sensor 5 similar to the acceleration speed sensor 3; switch 51 and a resistor 52 respectively similar to the switch 31 and the resistor 32.

A trouble detection circuit 6 for detecting trouble coming in the acceleration speed sensors 3 and 5 and the trigger means 4 consists of a differential amplifier 7 and a comparator 8.

The differential amplifier 7 comprises four resistors 71, 72, 73 and 74 and an operational amplifier 75. The amplification degree of the differential amplifier 7 is determined by the values of the resistors 71 to 74. The comparator 8 comprises three resistors 81, 82 and 83, two operational amplifiers 84 and 85 and an AND gate 86. The resistors 81, 82 and 83 are used for generating reference voltages of the comparator 8.

Numeral 9 designates an alarm lamp for indicating occurrence of trouble by lighting due to an output signal issued from the comparator 8 when the trouble actually occurs.

The above-mentioned conventional trouble detection apparatus for automobile air-bag system has the following problem that: the amplification degree of the differential amplifier 7 is relatively large, around 100, so that it has a possibility of being influenced by noise; the differential amplifier 7 amplifies the D.C. voltage component besides necessary A.C. component, so that the undesirable error component of the D.C. voltage is also amplified; and it is necessary to pay attention to the input voltage of the operational amplifier 75 so as not to exceed its tolerance range.

SUMMARY OF THE INVENTION

Object of the present invention is to solve the above-mentioned problems of the conventional trouble detection apparatus for an automobile air-bag system and to provide an improved trouble detection apparatus for an automobile air-bag system which is hardly affected by noise or an error component of the D.C. voltage in the amplifier, and is not restricted of its reliability by the tolerance of the input voltage of the amplifier.

A trouble detection apparatus for an automobile air-bag system in accordance with the present invention comprises:

Wheatstone bridge circuit including two resistors, a resistor connected between contacts of an acceleration speed sensor, and an internal resistance of a trigger means for inflating the air-bag;

a reference pulse generator for supplying pulse signals to the Wheatstone bridge circuit;

a current transformer connected across output terminals of the Wheatstone bridge circuit for producing a signal having no D.C. component;

an A.C. amplifier for amplifying signals issued from the current transformer;

a phase detector for phase detection of output of the A.C. amplifier; and a comparator for comparing an output of the phase detector with a reference signal and for producing a signal indicative of a condition of at least one of said the resistor connected between the contacts of the acceleration speed sensor and the internal resistance of the trigger means.

In the above-mentioned construction, the internal resistance of the trigger means for inflating the air-bag and the resistor connected between the contacts of the acceleration speed sensor, which resistances are the object of troubleshooting, are used as constituents of the Wheatstone bridge containing the reference resistors. When trouble occurs and the balance of the bridge is lost, a pulse signal corresponding to the reference pulse signals supplied to the bridge is outputted at the output terminals of the Wheatstone bridge circuit. The output signal is inputted to the current transformer, and the secondary winding thereof issues a corresponding signal. And the output of the secondary winding of the current transformer is amplified by the A.C. amplifier. Thereby, the D.C. component adversely influencing the output of the A.C. amplifier and the error component contained in the output are attenuated, thereby reducing noise. And also the D.C. component coming from the bridge circuit is isolated by the current transformer, thereby any voltage higher than the rated tolerance of the A.C. amplifier is not supplied to the A.C. amplifier. Furthermore, the phase of the output of the A.C. amplifier is detected by using the reference pulse signals. Therefore, components having a different frequency from the reference pulse are attenuated by the phase detection and the current transformer. As a result, the trouble detection apparatus for an automobile air-bag system in accordance with the present invention is hardly affected by electric noise.

DESCRIPTION OF PREFERRED EMBODIMENT

Figure 1:
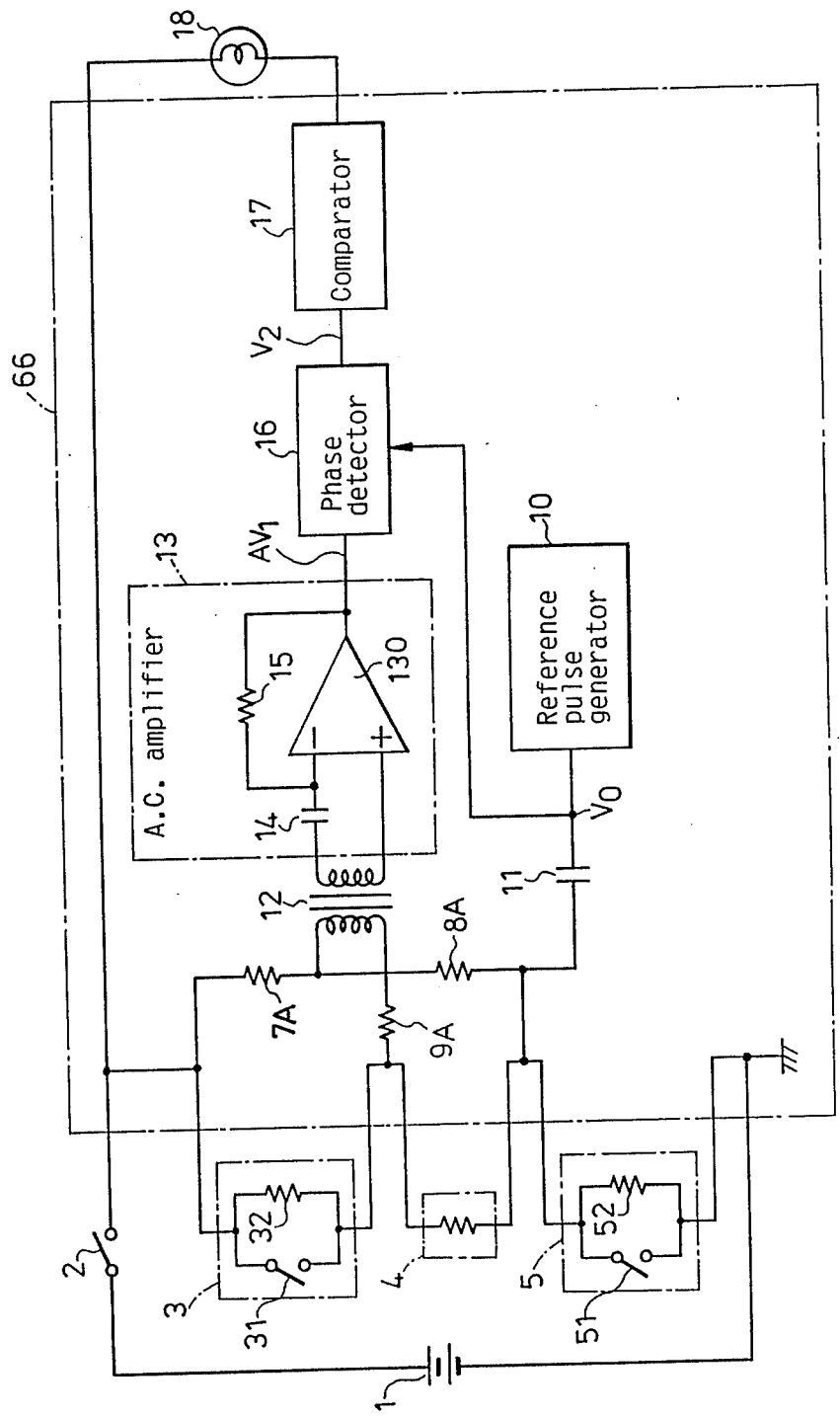
FIG. 1 is a circuit diagram showing a preferred embodiment of a trouble detection apparatus for an automobile air-bag system in accordance with the present invention.
Figure 2:
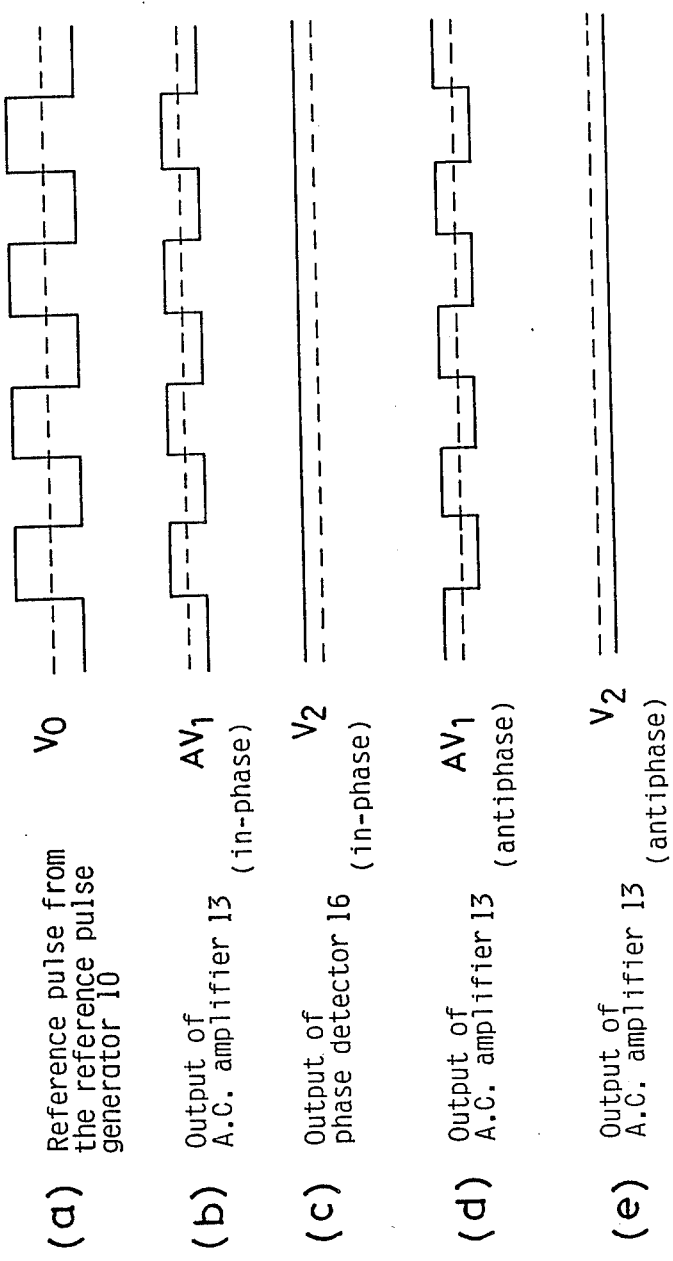
FIG. 2 is a drawing for showing waveforms in the circuit shown in FIG. 1.

A preferred embodiment of a trouble detection apparatus for an automobile air-bag system in accordance with the present invention is described referring to FIGS. 1 and 2.

In FIG. 1, trouble detection apparatus for an automobile air-bag system includes: a battery 1 loaded on an automobile; an ignition switch 2 connected to the battery 1; an acceleration speed sensor 3 for detecting clashing of the automobile thereby to close switch 31; a resistor 32 connected to both contacts of the switch 31; a trigger means 4 for inflating the air-bag by heating when an electric current is supplied thereto; another acceleration speed sensor 5 similar to the acceleration speed sensor 3; switch 51 and a resistor 52 respectively similar to the switch 31 and the resistor 32.

The switches 31 and 51 of the acceleration speed sensors 3 and 5 are generally opened. When the ignition switch 2 is closed, voltages of the battery 1 are divided by the resistors 32 and 52 and the internal resistance of the motor means 4. A voltage proportional to the internal resistance value of the motion means 4 is generated across both terminals thereof.

Hereupon, the values of the resistors 32 and 52 are generally over several hundreds ohms ($\Omega$). On the contrary, the value of the internal resistance of the motion means 4 is several ohms ($\Omega$). Since the voltage of the battery 2 is about 12 V, the voltage across the terminals of the trigger means 4 becomes several tens of millivolts. For example, when the values of the resistors 32 and 52 are respectively 1K$\Omega$ and the value of the internal resistance of the motion means 4 is 2 (first case), the voltage of 12 mV across the terminals of the trigger means 4 is given by:

$$12 \times \frac{2}{1000 + 1000 + 2} \approx 12 \text{ mV}. \tag{1}$$

Provided, the acceleration speed sensor 3 is in trouble and shortcircuited (second case), the voltage between the terminals of the trigger means 4 changes to $$12 \times \frac{2}{1000 + 2} \approx 24 \text{ mV}. \tag{2}$$

And when the trigger means 4 is shortcircuited (third case), the voltage across the terminals of the trigger means 4 becomes $$0 \text{ V} \tag{3}.$$

Figure 3:
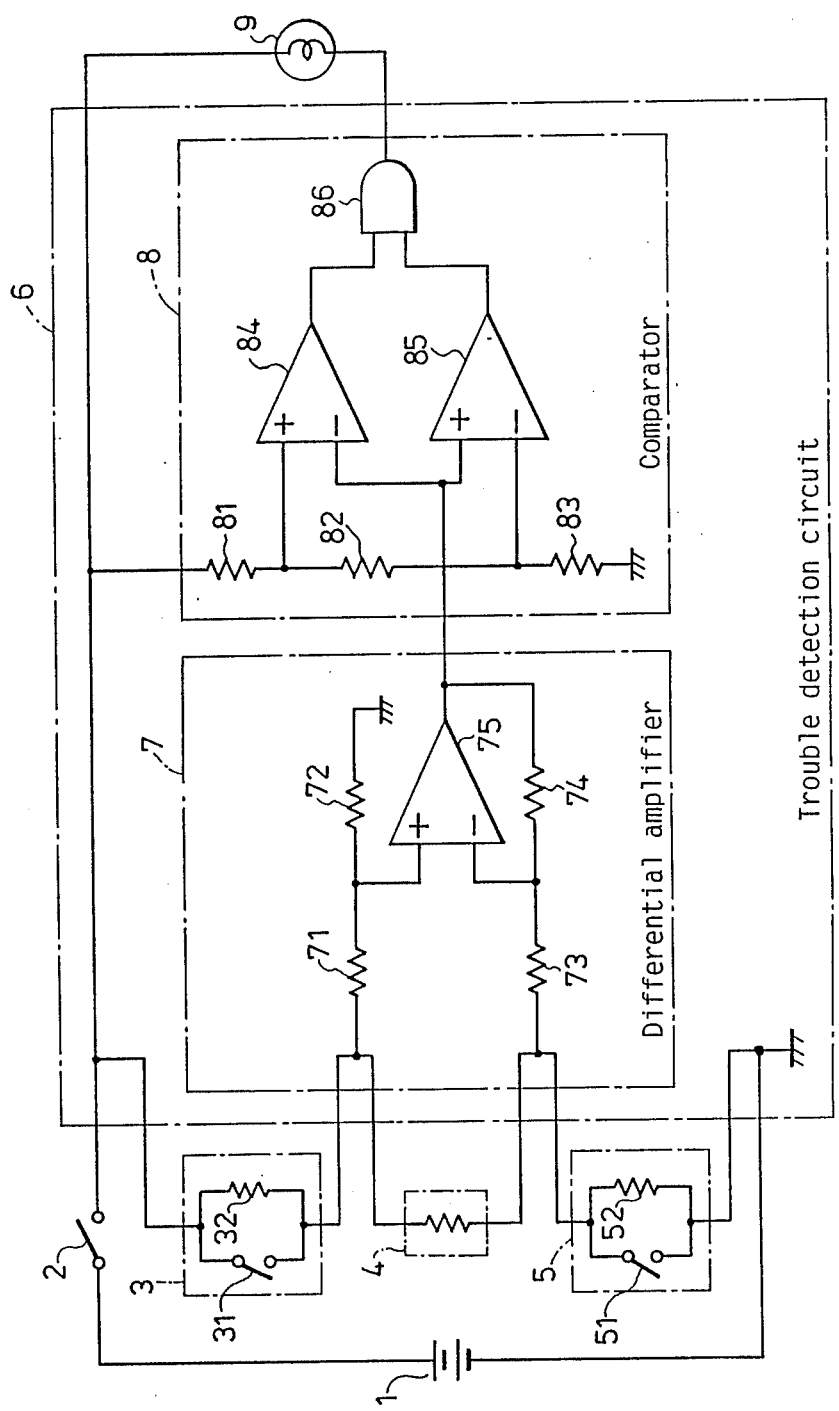
FIG. 3 is the circuit diagram showing a conventional trouble detection apparatus for an automobile air-bag system.

A trouble detection circuit 66 comprises resistors 7A, 8A and 9A, a reference pulse generator 10, a capacitor 11, a current transformer 12, an A.C. amplifier 13, a phase detector 16, and a comparator 17. A Wheatstone bridge is constituted with the resistors 7A and 8A, the resistor 32 connected between the contacts 31 of the acceleration speed sensor 3 and the internal resistance of the trigger means 4. The resistors 7A and 8A are adjusted for serving as reference resistors of Wheatstone bridge. The primary winding of the current transformer 12 and the resistor 9A are connected in a series connection between the connection point of the resistors 7A and 8A and the connection point of the acceleration speed sensor 3 and the trigger means 4. The resistor 9A serves as a load of the Wheatstone bridge. The capacitor 11 is connected between the resistor 8A and the input terminal of the reference pulse generator 10. The reference pulse generator 10 generates a reference pulse signal, which is supplied to the Wheatstone bridge and also to the phase detector 16. The A.C. amplifier comprises an operational amplifier 130, an input capacitor 14 thereto and a feedback resistor 15. The resistor 15 which is used for adjusting the gain of the operations amplifier 130 is connected between an inversion input terminal and the output terminal of the differential amplifier 130. The capacitor 14 is connected between the negative terminal of the operational amplifier 130 and one terminal of the secondary winding of the current transformer 12. The other terminal of the secondary winding of the current transformer 12 is connected to a non-inversion terminal of the operational amplifier 130. The phase detector 16 is for detecting the phase difference of the output of the A.C. amplifier 13, which amplifies output of the secondary winding of the current transformer 12 by the operational amplifier 130, from the phase of the reference pulse signals from the reference pulse generator. As the phase detector 16, a known phase detecting circuit including a smoothing circuit can be used, and thereby, details of the phase detector 16 is omitted. The comparator 17 compares the output of the phase detector 16 and predetermined reference signals generated by an appropriate reference signal generator 19 and thereby the occurrence of the trouble in the trigger means 4 or the resistor 32 in the acceleration speed sensor 3 is detected. The known comparator, for example, shown in FIG. 3 can be used for the comparator 17. An alarm lamp 18 which is similar to or the same as the conventional alarm lamp 9 is connected to the comparator 17.

Waveforms (a), (b), (c), (d) and (e) of FIG. 2 show the waveforms of the output signals of the reference pulse generator 10, the A.C. amplifier 13 and the phase detector 16, respectively. In FIG. 2, respective dotted lines show the common level and solid lines show the waveforms.

The reference pulse generator 10 generates reference pulse signals $V_0$ having a fixed frequency and a fixed amplitude as shown in FIG. 2(a), and the reference pulse $V_0$ is also supplied to the Wheatstone bridge through the capacitor 11. When values of the resistors 32, 7A, 8A and the internal resistance of the trigger means 4 make the Wheatstone bridge balance, no current flows through the resistor 9 and the primary winding of the current transformer 12. However, when the balance of the Wheatstone bridge is lost, current flows through the series circuit of the resistor 9A and the primary winding of current transformer 12.

The current flowing through the primary winding of the current transformer 12 includes an A.C. component by the reference pulse generator 10 and a D.C. component by the battery 1. The D.C. component in the current is isolated by the current transformer 12 and current induced in the secondary includes only the A.C. component. Therefore, the current $V_1 = f(V_0)$.

The relation between the current $V_1$ and the reference pulse signals $V_0$ follows the law of Wheatstone bridge.

The A.C. current from the secondary winding of the current transformer 12 is amplified by the A.C. amplifier 13, and the waveform of the amplified current which is corresponding to the output of the A.C. amplifier $AV_1$ is shown by waveforms (b) and (d) in FIG. 2. Hereupon, A is the amplification degree of the A.C. amplifier 13. The phases of the reference pulse signal $V_0$ and the output of the current transformer 12 are inphase or antiphase to each other. Such relation is determined by the direction of the current flowing on the series circuit of the resistor 9A and the primary winding of the current transformer 12 in the Wheatstone bridge. Namely, the direction of the current is determined by the ratio of the values of the resistor 32 and the internal resistance of the trigger means 4 and the ratio of the values of the resistors 7A and 8A.

The phase detection of the output signals $AV_1$ of the A.C. amplifier 13 is executed by the phase detector 16 using the reference pulse signal $V_0$ from the reference pulse generator 10 shown as waveforms (c) and (e) in FIG. 2. The output signal $V_2$ of the phase detector is given by $$V_2 = \frac{AV_1}{B}$$

hereupon, B is a ratio of input and output signals of the phase detector 16.

Namely, the difference between the output signal $V_2$ of the phase detector 16 and the common level shown by dotted line shows the degree of imbalance in the Wheatstone bridge. Furthermore, either the acceleration speed sensor 3 or the trigger means 4, wherein the trouble comes, can be judged by the level of the output signal $V_2$ of the phase detector 16.

When noise with different frequencies from that of the reference pulse signal $V_0$ comes and is superposed on the output signals $AV_1$ of the A.C. amplifier 13, the noise is attenuated by the phase detection by the phase detector 16. The use of the current transformer 12 is also advantageous in reducing the noise.

Finally, the value of the output signal $V_2$ of the phase detector 16 is judged by the comparator 17 whether a trouble occurs or not. And when the occurrence of the trouble is judged, the alarm lamp 18 is lighted.

As mentioned above, the trouble in the acceleration speed sensor 3 and the trigger means 4 is detected. In order to detect the occurrence of the trouble in another acceleration speed sensor 5, the same or similar trouble detection circuit to the aforementioned embodiment is connected to the junction point between the trigger means 4 and the acceleration speed sensor 5.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A trouble detection apparatus for an automobile air-bag system comprising:
    a Wheatstone bridge circuit including two resistors, together with a resistor connected between contacts of an acceleration speed sensor, and an internal resistance of a trigger means for inflating the air-bag;
    a reference pulse generator for supplying pulse signals to said Wheatstone bridge circuit;
    a current transformer connected across output terminals of said Wheatstone bridge circuit for producing a signal having no D.C. component;
    an A.C. amplifier for amplifying signals issued from said current transformer;
    a phase detector for phase detection of an output of said A.C. amplifier; and
    a comparator for comparing an output of said phase detector with a reference signal and for producing a signal indicative of said resistor connected between said contacts of said acceleration speed sensor or the internal resistance of said trigger means.

* * * * *